United States Patent [19]

Sause

[11] 3,875,144

[45] Apr. 1, 1975

[54] 4-AZATRICYCLO(4.3.1.1$^{3,8}$)UNDECANE-4-ALKANOL HYDROCHLORIDES

[75] Inventor: H. William Sause, Deerfield, Ill.

[73] Assignee: G. D. Searle & Co., Chicago, Ill.

[22] Filed: Sept. 28, 1973

[21] Appl. No.: 401,813

Related U.S. Application Data

[63] Continuation-in-part of Ser. No. 292,983, Sept. 28, 1972, Pat. No. 3,845,038.

[52] U.S. Cl. ............................. 260/239 B, 424/244
[51] Int. Cl............................................ C07d 41/04
[58] Field of Search ................................ 260/239 R

[56] References Cited

UNITED STATES PATENTS 3,631,165  12/1971  Berezin ........................... 260/239 B
3,763,165  10/1973  Naraynan et al................ 260/239 B

*Primary Examiner*—Alton D. Rollins
*Attorney, Agent, or Firm*—John M. Brown

[57] ABSTRACT

Preparation and the utility, both as antiviral agents and chemical intermediates, of 4-azatricyclo[4.3.1.1$^{3,8}$]undecane-4-alkanol hydrochlorides, corresponding bases, and other salts thereof are disclosed.

6 Claims, No Drawings

4-AZATRICYCLO(4.3.1.1$^{3,8}$) UNDECANE-4-ALKANOL HYDROCHLORIDES

The application for Letters Patent securing the invention herein described and claimed is a continuation-in-part of applicant's prior copending application Ser. No. 292,983 filed Sept. 28, 1972, now U.S. Pat. No. 3,845,038.

This invention relates to 4-azatricyclo[4.3.1.1$^{3,8}$]undecane-4-alkanol hydrochlorides and processes for the preparation thereof. More particularly, this invention provides new, useful, and unobvious chemcial compounds of the formula

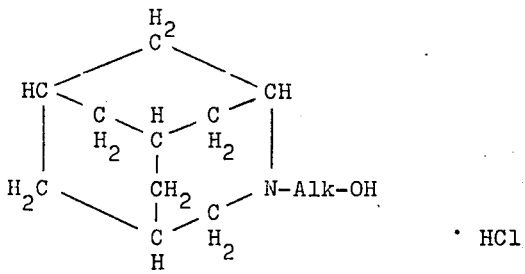

wherein Alk represents alkylene. Among the alkylenes represented by Alk, those containing more than 1 and fewer than 7 carbons are preferred, for example, ethylene, propylene, trimethylene, 1-methyltrimethylene, 1,2-dimethyltrimethylene, 1-ethyltrimethylene, 1-ethyl-2-methyltrimethylene, and like bivalent, saturated, acyclic, straight- or branched-chain, hydrocarbon radicals of empirical formula

wherein $n$ represents a positive integer amounting to at least 2 but not more than 6.

The compounds of this invention are useful by reason of their valuable biological properties — specifically, to name one, their antiviral activity. The subject compounds are also useful as intermediates to the interferon-inducing and antibiotic agents disclosed in the aforesaid prior copending application.

The antiviral utility of the compounds to which this invention relates is evident from the results of a standardized test for their capacity to inhibit the growth of Influenza A (Strain 575). In this test, cell cultures of primary Rhesus monkey kidney maintained in 25-ml. plastic flasks and each containing test compound at concentrations of 625, 125, 25, 5 or 1 mcgm. per ml. are prepared in pairs. These flasks, and an identical pair of flasks containing no test compound, are each inoculated with a dose of Influenza A (Strain 575) previously shown to produce maximum hemadsorption and minimum cytopathogenic effects after a 24-hour incubation. Where the cultures contain test compound, the virus is added 1 hour after addition of the compound to the culture. After 24-hour incubation of the cultures, the supernatant fluids are removed and 3.0 ml. of a 0.4 percent suspension of guinea pig erythrocytes is added to each flask. The flasks are then incubated at 4 °C. in a horizontal position for 30 minutes. The flasks are rocked every 10 minutes during the incubation period. After this incubation, the red cell suspension is decanted from each flask, the flasks are washed twice with 3.0 ml. of pH 7.4 phosphate buffer solution to remove unadsorbed red cells, and 3.0 ml. of distilled water is then added to lyse the adsorbed cells. The flasks are further incubated at 37°C. for 30 minutes in a horizontal position and rocked every 10 minutes. After this incubation, the fluid contents of the pairs of flasks are combined to form an assay unit and are placed at room temperature for 15–30 minutes to allow settling of cellular debris. A pair of control flasks identical with the above, except for the absence of test compound and virus inoculation, is run concurrently. The resulting hemoglobin solutions from each assay unit are read for optical density in a Beckman spectrophotometer at about 415 millimicrons. A test compound is considered active if, at one of the tested levels, it reduces the optical density reading by at least 50 percent, relative to the virus control. Representative compounds of this invention were found active against Influenza A (Strain 575) at concentrations ranging from 5 to 25 mcgm. per ml. in the foregoing test.

Those skilled in the art will recognize that observations of activity in standardized tests for particular biological effects are fundamental to the development of valuable new drugs, both veterinary and human.

Equivalent to the foregoing hydrochlorides for the purposes of this invention are the corresponding basic alkanols and, especially when used as antiviral agents, other non-toxic acid addition salts comprehended by the formula

wherein R represents 4-azatricyclo[4.3.1.1$^{3,8}$]undecan-4-yl, Alk is defined as before, X represents 1 equivalent of an anion — for example, bromide, iodide, nitrate, phosphate, sulfate, sulfamate, methyl sulfate, ethyl sulfate, benzenesulfonate, toluenesulfonate, acetate, lactate, succinate, malate, maleate, tartrate, citrate, gluconate, ascorbate, benzoate, cinnamate, or the like — which, in combination with the cationic portion of the salt aforesaid, is neither biologically nor otherwise undesirable, and n represents 0 or 1.

Preparation of the hydrochlorides of this invention proceeds by heating 4-azatricyclo[4.3.1.1$^{3,8}$]undecane with a haloalkanol of the formula

in the presence of sodium carbonate and catalytic amounts of sodium iodide, using tetrahydrofuran as solvent, then adding excess hydrogen chloride dissolved in 2-propanol to the resultant basic alkanol. Alternatively, hydrochlorides of the formula

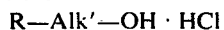

in which Alk' represents ethylene or propylene are prepared by heating 4-azatricyclo[4.3.1.1$^{3,8}$]undecane with ethylene or propylene oxide in a closed vessel, using absolute ethanol as solvent, then adding excess hydrogen chloride dissolved in 2-propanol to the resultant basic alkanol. Still another route to the instant hydrochlorides is via the Mannich reaction between 4-azatricyclo[4.3.1.1$^{3,8}$]undecane hydrochloride, formaldehyde, and a ketone containing fewer than 6 carbon atoms and at least 1 active hydrogen such as acetone, 2-butanone, 2-pentanone, 3-pentanone, or the like, reduction of the resultant amino ketone hydrochloride with sodium borohydride, and acidification of the reduction product with excess hydrogen chloride dissolved in 2-propanol. R and Alk in the formulas in this paragraph retain the meanings previously assigned.

The hydrochlorides of this invention are converted to equivalent basic alkanols on contacting with excess alkali, and the basic alkanols, in turn, are converted to acid addition salts equivalent to the hydrochlorides hereof by contacting with 1 equivalent of any of various inorganic and strong organic acids wherein the anion conforms to X as hereinbefore defined.

The following examples describe in detail compounds illustrative of the present invention and methods which have been devised for their preparation. It will be apparent to those skilled in the art that many modifications, both of materials and of methods, may be practiced without departing from the purpose and intent of this disclosure. Throughout the examples hereinafter set forth, temperatures are given in degrees centigrade and relative amounts of materials in parts by weight, except as otherwise noted.

EXAMPLE 1

4-Azatricyclo[4.3.1.1^{3,8}]undecane-4-ethanol hydrochloride.

A solution of 633 parts of 3-azatricyclo[4.3.1.1^{3,8}]undecane ("4-azahomoadamantane") and 360 parts of ethylene oxide in 7,900 parts of absolute alcohol is heated in a closed vessel at 110°–114° for 24 hours, then cooled and filtered. The filtrate is stripped of solvent by vacuum distillation, and the residue is dissolved in ether. The ether solution is filtered, and to the filtrate is added excess hydrogen chloride dissolved in 2-propanol. The precipitate which forms is filtered off, washed with ether, and dried at 65°. The 4-azatricyclo[4.3.1.1^{3,8}]=undecane-4-ethanol hydrochloride thus isolated, upon recrystallization from a mixture of ethanol and ether, melts at approximately 178.5°–179.5°.

EXAMPLE 2

α-Methyl-4-azatricyclo[4.3.1.1^{3,8}]undecane-4-ethanol hydrochloride.

A solution of 151 parts of 4-azatricyclo[4.3.1.1^{3,8}]undecane and 116 parts of propylene oxide in 1,580 parts of absolute ethanol is heated in a closed vessel for 24 hours at 100°–110°, then cooled and filtered. The filtrate is stripped of solvent by vacuum distillation. The residue is taken up in ether. The ether solution is filtered, whereupon excess hydrogen chloride dissolved in 2-propanol is added. The precipitate which forms is filtered off, dried at 60° in air, and recrystallized from a mixture of ethanol and ether to give α-methyl-4-azatricyclo[4.3.1.1^{3,8}]undecane-4-ethanol hydrochloride melting at approximately 224°–224.5° The product has the formula

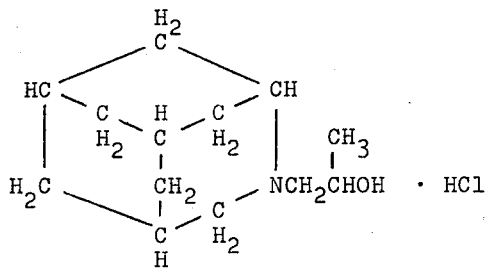

EXAMPLE 3

4-Azatricyclo[4.3.1.1^{3,8}]undecane-4-propanol hydrochloride.

To a solution of 151 parts of 4-azatricyclo[4.3.1.1^{3,8}]undecane in approximately 395 parts of tetrahydrofuran is consecutively added, with stirring at room temperature, a solution of 188 parts of 3-chloro-1-propanol in 450 parts of tetrahydrofuran, 84 parts of sodium bicarbonate, and 1 part of sodium iodide. The resultant mixture is stirred at the boiling point under reflux for 5 hours, then cooled and thereupon diluted with an equal volume of chloroform. Insoluble solids are filtered from the diluted reaction mixture and the filtrate is reserved while the solids are taken up in water; the aqueous solution is made alkaline and then extracted with ether; and the other extract is combined with the filtrate. The resultant solution is dried over sodium carbonate and filtered. The filtrate is stripped of solvent by vacuum distillation. The residue is taken up in ether, and the ether solution is filtered. To the filtrate is added excess hydrogen chloride dissolved in 2-propanol. The precipitate which forms is collected by filtration, dried in air, and recrystallized from a mixture of acetone and methanol to give 4-azatricyclo[4.3.1.1^{3,8}]undecane-4-propanol hydrochloride which sinters at around 169.5° and melts at approximately 170.5°–171.5°.

EXAMPLE 4

A. 4-(4-Azatricyclo[4.3.1.1^{3,8}]undecan-4-yl)-2-butanone hydrochloride.

A mixture of 187 parts of 4-azatricyclo[4.3.1.1^{3,8}]undecane hydrochloride, 162 parts of 37 percent formaldehyde, 116 parts of acetone, and 400 parts of 95 percent ethanol is stirred at 60° for 4 hours. During the first hour, solution occurs. At the end of the first hour, an additional 58 parts of 37 percent formaldehyde is introduced. Solvent is removed by vacuum distillation when the 4-hour heating period is concluded, and the residue is recrystallized from a mixture of ethanol and benzene to give 4-(4-azatricyclo[4.3.1.1^{3,8}]undecan-4-yl)-2-butanone hydrochloride which darkens in the range 200°–320° and decomposes at 320°–330°.

B. α-Methyl-4-azatricyclo[4.3.1.1^{3,8}]undecane-4-propanol hydrochloride.

To a solution of 257 parts of 4-(4-azatricyclo[4.3.1.1^{3,8}]undecan-4-yl)-2-butanone hydrochloride in 1,600 parts of 95 percent ethanol is added, with stirring during 1 hour under nitrogen, a solution of 75 parts of sodium borohydride in 1,040 parts of 95 percent ethanol. The resultant mixture is heated at the boiling point under reflux for 3 hours, then cooled and finally diluted with a mixture of 580 parts of glacial acetic acid and 245 parts of water. Insoluble solids are filtered out, and the filtrate is stripped of solvent by vacuum distillation. The residue is taken up in a minimal quantity of water. The aqueous solution is made alkaline with 5 percent sodium hydroxide and thereupon extracted with ether. The ether extract is dried over sodium carbonate and stripped of solvent by distillation. The residue is taken up in benzene; and the benzene solution is chromatographed on silica gel, using benzene and mixtures thereof with increasing amounts of ethyl acetate as developing solvent. From an eluate comprising 5 percent ethyl acetate in benzene, solvent is removed by vacuum distillation and the residue taken up in ether. The ether solution is filtered, and to the filtrate is added excess hydrogen chloride dissolved in 2-propanol. The precipitate which forms is isolated by filtration and recrystallized from acetone to give α-methyl-4-azatricyclo[4.3.1.1^{3,8}]undecane-4-propanol hydrochloride melting at approximately 197°–198°.

EXAMPLE 5

A. 1-(4-Azatricyclo[4.3.1.1³,⁸]undecane-4-yl)-2-methyl-3-pentanone hydrochloride.

Substitution of 172 parts of 3-pentanone for the acetone called for in Example 4A affords, by the procedure there detailed, 1-(4-azatricyclo[4.3.1.1³,⁸]undecane-4-yl)-2-methyl-3-pentanone hydrochloride.

B. α-Ethyl-β-methyl-4-azatricyclo[4.3.1.1³,⁸]-undecane-4-propanol hydrochloride.

Substitution of 285 parts of 1-(4-azatricyclo[4.3.1.1³,⁸]undecan-4-yl)-2-methyl-3-pentanone hydrochloride for the 4-(4-azatricyclo[4.3.1.1³,⁸]undecan-4-yl)-2-butanone hydrochloride called for in Example 4B affords, by the procedure there detailed, α-ethyl-β-methyl-4-azatricyclo[4.3.1.1³,⁸]undecane-4-propanol hydrochloride. The product has the formula

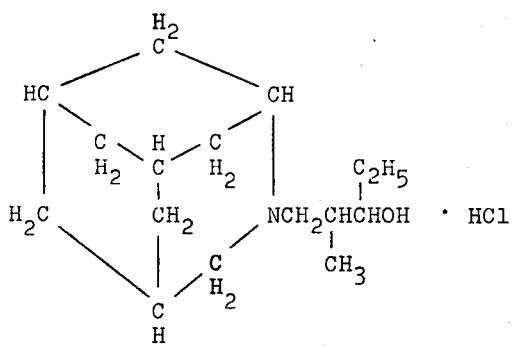

EXAMPLE 6

A. 4-(4-Azatricyclo[4.3.1.1³,⁸]undecan-4-yl)-3-methyl-2-butanone hydrochloride and 1-(4-azatricyclo[4.3.1.1³,⁸]undecan-4-yl)-3-pentanone hydrochloride.

Substitution of 144 parts of 2-butanone for the acetone called for in Example 4A affords, by the procedure there detailed, a mixture of 4-(4-azatricyclo[4.3.1.1³,⁸]undecan-4-yl)-3-methyl-2-butanone hydrochloride and 1-(4-azatricyclo[4.3.1.1³,⁸]-undecan-4-yl)-3-pentanone hydrochloride.

B. α,β-Dimethyl-4-azatricyclo[4.3.1.1³,⁸]undecane-4-propanol hydrochloride and α-ethyl-4-azatricyclo[4.3.1.1³,⁸]undecane-4-propanol hydrochloride.

Substitution of 272 parts of a mixture of 4-(4-azatricyclo]4.3.1.1³,⁸]undecan-4-yl)-3-methyl-2-butanone hydrochloride and 1-(4-azatricyclo[4.3.1.1³,⁸]undecan-4-yl)-3-pentanone hydrochloride prepared as described in the foregoing part A of this example for the 4-(4-azatricyclo[4.3.1.1³,⁸]undecan-4-yl)-2-butanone hydrochloride called for in Example 4B affords, by the procedure there detailed, a mixture of α,β-dimethyl-4-azatricyclo[4.3.1.1³,⁸]-undecane-4-propanol hydrochloride and α-ethyl-4-azatricyclo[4.3.1.1³,⁸]undecane-4-propanol hydrochloride.

What is claimed is:

1. A compound of the formula

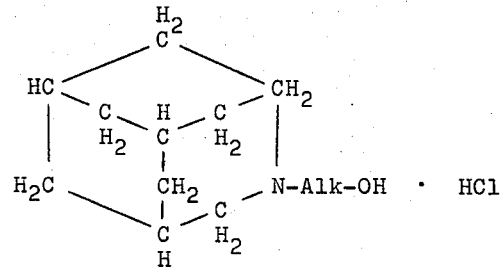

wherein Alk represents alkylene containing more than 1 and fewer than 7 carbons.

2. A compound according to claim 1 which is 4-azatricyclo[4.3.1.1³,⁸]undecane-4-ethanol hydrochloride.

3. A compound according to claim 1 which is α-methyl-4-azatricyclo[4.3.1.1³,⁸]undecane-4-ethanol hydrochloride.

4. A compound according to claim 1 which is 4-azatricyclo[4.3.1.1³,⁸]undecane-4-propanol hydrochloride.

5. A compound according to claim 1 which is α-methyl-4-azatricyclo[4.3.1.1³,⁸]undecane-4-propanol hydrochloride.

6. A compound according to claim 1 which is α-ethyl-β-methyl-4-azatricyclo[4.3.1.1³,⁸]undecane-4-propanol hydrochloride.

* * * * *